Figure 6:
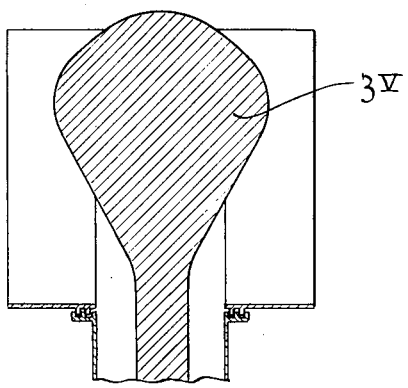

Feb. 20, 1951   F. M. ROUGET   2,542,095
SORTING, CLASSIFYING, AND PURIFYING APPARATUS
Filed Nov. 1, 1947                                5 Sheets-Sheet 1
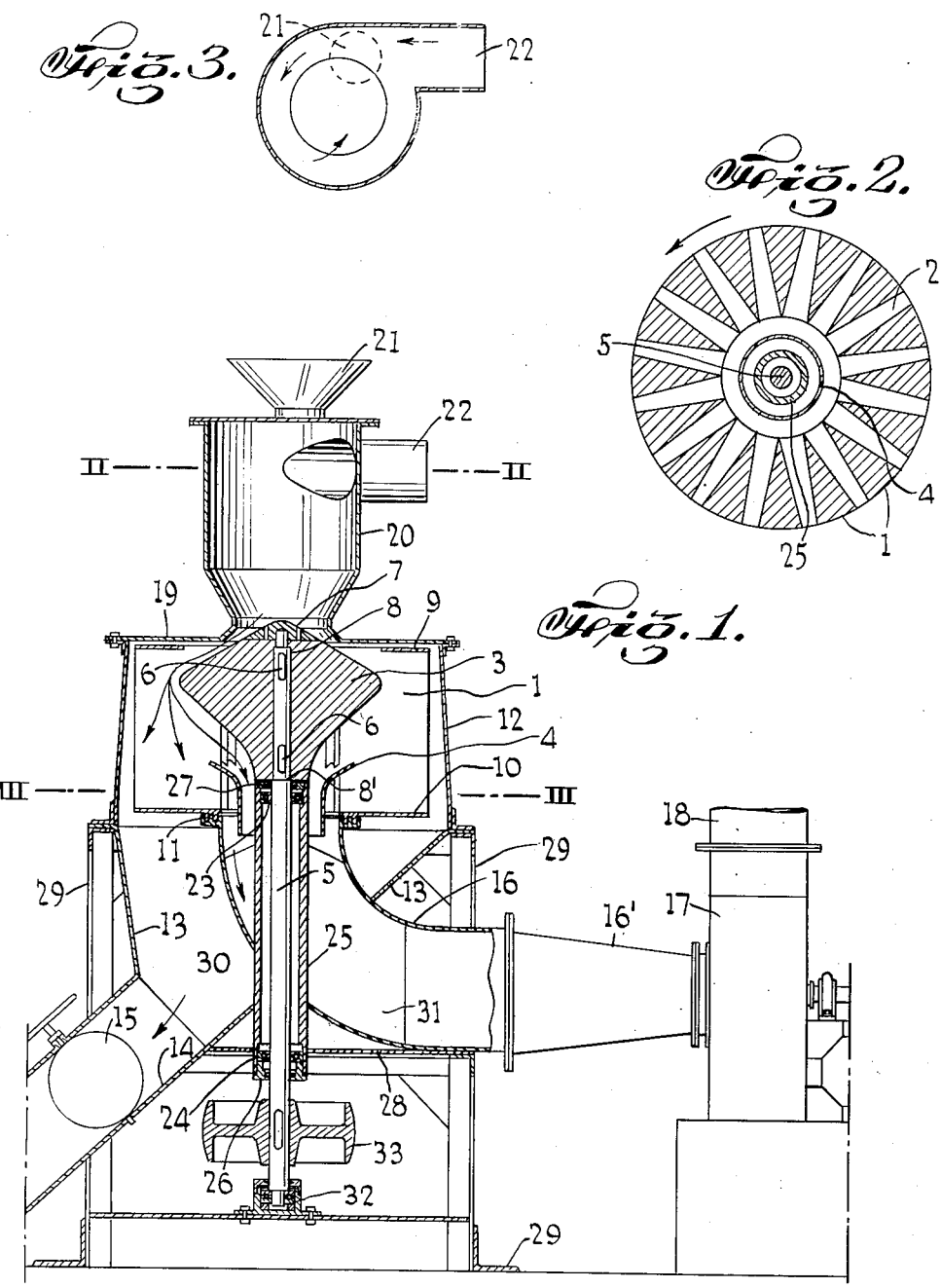
INVENTOR.
François Marie Rouget
BY
Lyman E. Dodge
ATTORNEY

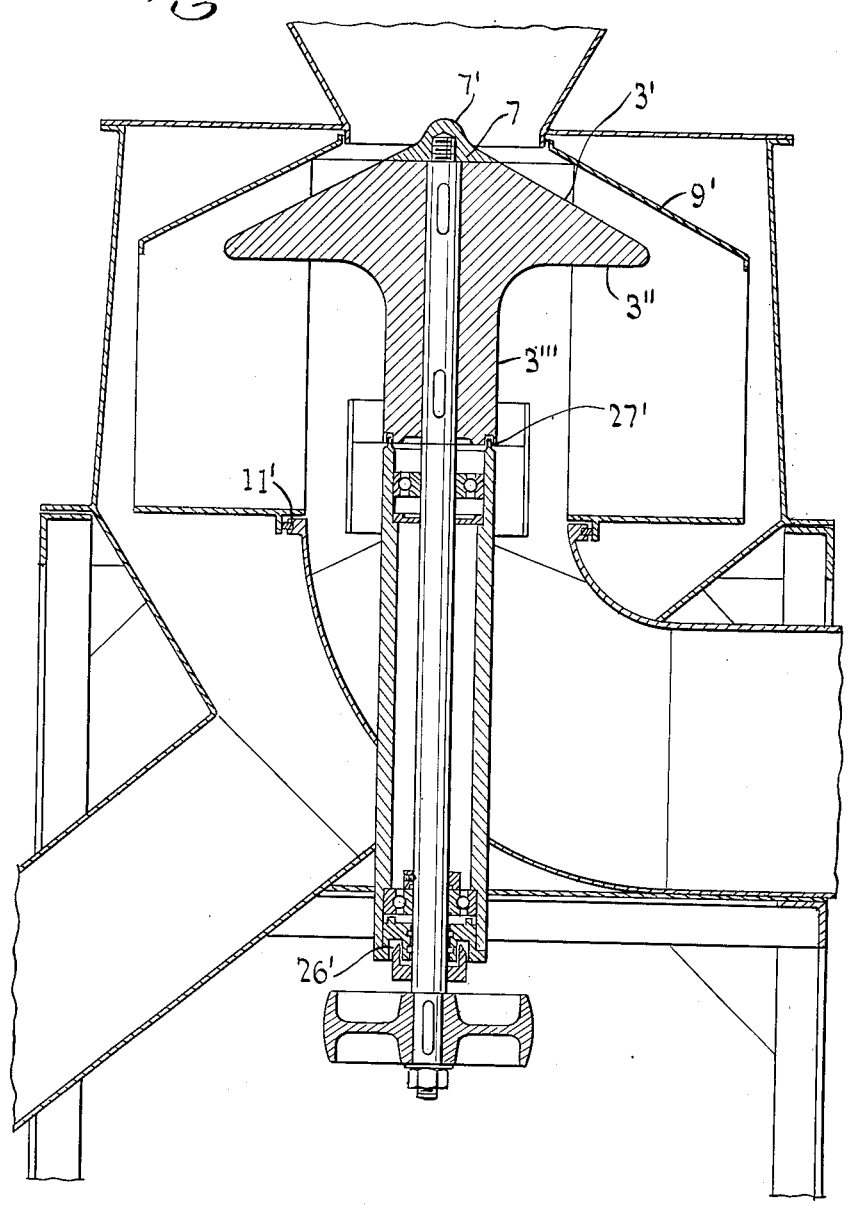

Feb. 20, 1951 F. M. ROUGET 2,542,095
SORTING, CLASSIFYING, AND PURIFYING APPARATUS
Filed Nov. 1, 1947 5 Sheets-Sheet 3

INVENTOR.
François Marie Rouget
BY
Lyman E. Dodge
ATTORNEY

Feb. 20, 1951  F. M. ROUGET  2,542,095
SORTING, CLASSIFYING, AND PURIFYING APPARATUS
Filed Nov. 1, 1947  5 Sheets-Sheet 4

INVENTOR.
François Marie Rouget
BY
Lyman E. Dodge
ATTORNEY

Feb. 20, 1951  F. M. ROUGET  2,542,095
SORTING, CLASSIFYING, AND PURIFYING APPARATUS
Filed Nov. 1, 1947  5 Sheets-Sheet 5

INVENTOR.
Francois Marie Rouget
BY
Lyman E. Dodge
ATTORNEY

Patented Feb. 20, 1951

2,542,095

UNITED STATES PATENT OFFICE 2,542,095

SORTING, CLASSIFYING, AND PURIFYING APPARATUS

François Marie Rouget, Paris, France

Application November 1, 1947, Serial No. 783,493
In France June 26, 1947

3 Claims. (Cl. 209—145)

Particle sorting or classifying or separating apparatus is known which comprises a rotor and a fan or aspirator mounted in opposition, the rotor being provided with tubes, practically radial, the cross section of which decreases gradually from the center towards the periphery, and in which the rotor is mounted in such a way as to rotate around a horizontal spindle in a chamber connected at its center to the fan and receiving, tangentially, on its periphery, a flow of gas, maintaining, in a state of suspension, the particles to be sorted.

Classification is accomplished in accordance with the mass of a particle (effect of centrifugal force) and of its surface (driving effect of the flow of gas) in the rotor tubes, these latter having preferably a cross section, at a distance R from the center, in inverse ratio to $\sqrt{R}$. The walls of the tubes are given a surface as smooth as possible (by polishing for instance) to make allowance for the influence of the Coriolis acceleration.

The present invention relates to apparatus belonging to the class mentioned above, but particularly designed in such a way as to allow a more thorough sorting and a better output per unit of time. Moreover, this improved apparatus allows the sorting to be done with the help of a liquid, as an auxiliary fluid holding up the particles, or suspensions or like mixtures in which the continuous phase is liquid to be purified or otherwise desirably altered.

An essential feature of the apparatus, the subject of the present invention, is the following: the chamber containing the rotor and in which this latter is preferably mounted to rotate around a vertical axis, comprises a central intake aperture located opposite one of the faces of the rotor while the aperture through which the exhaust or aspiration is brought to the center of said chamber is located opposite to the opposite face, the rotor being provided, at the entrance to each of its sorting passages, with guiding means for the fluid flow which obstructs the central portion of the passages and extends from the entrance face to intermediate points on the passages, on the one hand between this face and the opposite face, and on the other hand, between the center and the periphery of the rotor. The guiding means assembly thus belongs to a surface which, as a whole ends in a more or less blunt point, towards the fluid intake side in the chamber.

In the most convenient tangible form the guiding means may be a solid of revolution and may consist of the upper part of a nave or hub expanding near the intake face of the rotor and offering a dome or swell towards said face, for instance, a mushroom-shaped nave, or a pear-shaped nave, blades being set into said nave to separate and define the sorting ducts.

The ducts are of a decreasing cross section from the center towards the periphery. This section preferably varies according to the inverse of the square root of the distance from the center.

It is an advantage to give the ducts, for example, by polishing, walls as smooth as possible.

Due to the essential features stated above, the suspension to be treated is smoothly brought into the ducts to an intermediary region between their opposite faces and between their center and periphery, there to be subjected to the differential action of the field of centrifugal force and of the field of centripetal force (exhaustion). The lower part of the expanded nave may be shaped in such a way that the filaments of lifting fluid subject to the exhaust are well distributed upon the whole surface of the ducts and that the exhaust action in said ducts is uniform.

Various other features will appear from the following description, in connection with the annexed drawings given solely as non-limiting examples, in order to better explain how the present invention may be practiced. The features appearing in the drawings as well as in the description are of course part of said invention.

Fig. 1 is a vertical axial cross section, of an apparatus built in conformity with the invention; Figs. 2 and 3 are partial cross-sections on lines II—II and III—III of Fig. 1; Figs. 4 to 8 inclusive, exhibiting various embodiments of the invention, show, from the same viewpoint as in Fig. 1, portions more or less complete of the modified apparatus.

The apparatus represented in Figs. 1 and 2 comprises a rotor with a vertical or practically vertical spindle provided with radially positioned blades 1 leaving between them ducts or channels 2, the section of which, at a distance R from the rotor spindle, is in inverse ratio to $\sqrt{R}$.

Blades or partitions 1 are integral with a central nave 3 the top, upstream or upper part of which is convex towards the top, while the inferior, or down stream or lower part grows thinner towards the bottom. Blades 1 are, besides, integral with a tubular member or flue 4, which is upwardly flaring and located at such a distance from the lower part of nave 3, so as to provide an annular passage and at the same time to tie the blades together.

Nave 3 is keyed, by means of cotter pins 6, onto driving shaft 5 provided with shoulders 8 and 8' to receive the corresponding bearing surfaces of the nave. A blind nut 7 screwed on a threaded end of shaft 5, locks nave 3 on said shaft. Nut 7 is provided in the form of a cap or head of a mushroom in order to insure an uninterrupted profile with nave 3.

Blades 1 extend only a major portion of the distance to the center of the rotor and are united at their upper part by an annular plate 9 and are of gradually increasing cross section toward the periphery; the lower part is closed by another annular plate 10. This latter carries elements of a seal 11 which, as shown in the drawings, is of the labyrinth type. The lower face of plate 10 may be provided with radial blades or plates.

The rotor is enclosed in casing 12 slightly opening out towards the bottom in order to facilitate the descent, into a conical funnel 13 of the material thrown out of ducts 2. The lower part of this funnel is provided with a spout 14 which can be shut off by means of a damper or butterfly valve 15.

Under the central part of the rotor is located an exhaust or downdraft tube 16 which, at its upper part, carries the other elements of seal 11. Tube 16, by means of a coupling 16' in the shape of a truncated cone, terminates at a fan 17 provided with an outlet duct or port and driven by an engine, not shown.

Casing 12 is closed at its upper part by a lid 19 surmounted, at its center, by a distribution device 20 communicating with the casing. This distribution device, in the chosen example, is similar to a cyclone and belongs to the class of static centrifuges with tangential entrance. To accomplish this, it is composed of a cylindrical chamber in which opens tangentially a gaseous fluid intake tube 22. A funnel 21, used for the admission of the substance to be sorted, surmounts the chamber 20 and opens into it above the gaseous stream arriving through tube 22 (Figs. 1 and 3).

Shaft 5 is provided with a bearing composed of a tube 25 and ball-bearings 23 and 24, located between this tube and the shaft. Tube 25 is closed by seals 26 and 27, for example, felt packings or seals. It is affixed, at one point on the middle cross bar 28 of the frame 29 supporting the whole unit, and at another point inside the exhaust bend 16 by gussets 30 and 31.

Shaft 5 rests on the lower floor of the frame by means of a ball-bearing 32 and is driven by a pulley 33. This ball-bearing may be eliminated and in such a case, the shaft is suspended in ball bearings. The driving device may have, instead of a pulley and belt, a cone drive or any other mechanical control.

The apparatus which has just been described operates as follows: Fan 17 and shaft 5, thus rotor 1, 3 being driven at suitable speeds, the gaseous fluid, generally air is sucked through duct 22. It assumes a gyratory movement inside chamber 20 and sweeps into suspension the pulverulent substance to be sorted which has been introduced into funnel 21 (preferably by means of a distributor, not shown). The lay out of duct 22 and the direction of rotation of the rotor have been chosen in such a way that this gyratory movement is caused in the direction of rotation of the rotor. Chamber 20 then plays the part of a static centrifugal machine in which a sorting process may start.

The particles thus suspended, enter casing 12 through the annular opening existing between the upper part of nave 3 and the bottom of chamber 20. In ducts 2, the particles, subjected simultaneously to the movement caused by fan 17 and to the centrifugal force, separate by characteristics, the larger and/or the denser going to the periphery and falling into funnel 13, while the finer and/or the less dense are forced towards the rotor spindle and go into duct 16 partly directly, partly by means of flue 4. This latter, besides acting as a support, as indicated above, plays the part of an eddy preventing device.

The suspended particles gathered by tube 16 after having gone through fan 17, may be directed towards any suitable recovery apparatus for these particles, for instance, a cyclone, a zigzag passage, an ordinary filtration device (such as a bag filter) or an electrostatic filtration device.

Naturally, the method of embodying illustrated on Fig. 1 is not the only one which can be adopted for embodying the invention. For instance, the suspension of the pulverulent substance before its admission into casing 12 of the selector may be accomplished by other means, one instance of which will be given hereafter. Also the exit duct 18 may be connected to the admission duct 22 for the fluid by means of the device for the separation of the fine and/or light particles, which has been mentioned above. When one provides thus for such a particular organization for the cycle for the fluid carrying the particles, the fluid warms during the operation, and both the separation and the suspension of the particles, therefore, the effectiveness of the sorting, are bettered.

It will be noted in the separation provided for and accomplished by the device of Fig. 1, that the particles are first subjected to the additive effect of centrifugal force and a vacuum as they go down along the top of the nave 3 and this zone merges into another zone below the extreme diameter of the nave 3 into a zone in which the particles are subjected to centrifugal force and a vacuum in opposition. The particles to be separated are passing in a generally axial direction of the rotor. In the first zone they tend to move away from the axis of the rotor, while in the second zone, the opposition of forces results in a very efficient selection or sorting.

Other various possible modifications will result from the description hereinafter.

Figure 4 illustrates, first of all, the possibility of giving various shapes to the naves. In this instance, the upper part $3'$ shows, as previously, a practically conical shape but the whole assumes an outline closer to that of a mushroom, the inner face $3''$ being sensibly flat and being attached to a practically cylindrical stem $3'''$. This figure shows, besides, a particular shape of the upper annular connecting plate which may also be adopted in the case of Fig. 1. This plate $9'$ is in the shape of a truncated cone and its slope is practically the same as that of head $3'$. Nut 7 may, as indicated, exhibit a central boss $7'$.

Figure 5:
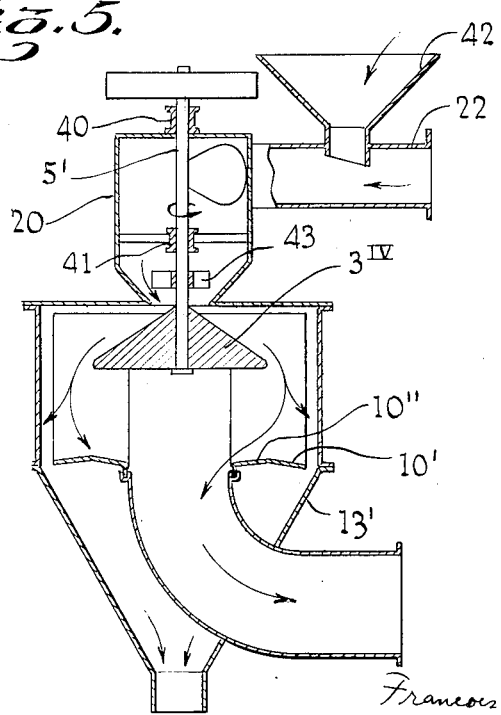

This same figure also shows a variant of the embodiment of the seals. The labyrinth-shaped seal 11 of Fig. 1 is replaced in this instance by a felt-packed seal $11'$ and the felt-packed seals 26, 27 of Fig. 1 are replaced by zigzag joints or rotating deflectors $26'$ and $27'$ respectively. It is moreover possible, in all the embodiments, to provide the exit face of the rotor with radial wings long enough to constitute a fan insuring tightness while in rotation, as is understood technically. Fig. 5 shows, first of all, a variant of the mounting of the rotating assembly. Nave $3^{IV}$ is substantially the head of a mushroom like $3'$ (Fig. 4); besides, shaft $5'$ which, towards the lower part, does not appreciably go beyond the lower face of nave $3^{IV}$, extends upwardly through chamber 20 for putting the particles in suspension, and is supported by means of bearings 40, 41. Furthermore, in this example, the material to be sorted is admitted into duct 22, the intake device having been represented as a funnel 42. Funnel 13' for the exit of large and/or dense particles, is in this instance vertical instead of inclined. It is to be noticed that the lower plate of the rotor comprises a peripheric annular part 10' shaped as a truncated cone with its apex positioned upwards, and a central annular part 10" shaped as a truncated cone with its apex downwards, due to which gravity intervenes and helps the sorting process. As indicated in this figure, one may provide on the rotor spindle, thin plates 43, for instance, straight, acting as a fan. Such thin plates are designed to help and increase the rotation and the flow of the lifting fluid in order to insure a smooth admission into the rotor and start, if need be, the sorting by centrifugal action.

In the example of Fig. 6, nave $3^V$ shows a pear-shaped section in which all curves have a rather large radius, this section being more suitable for certain substances to be sorted and for certain fluids for lifting particles.

Figure 7:
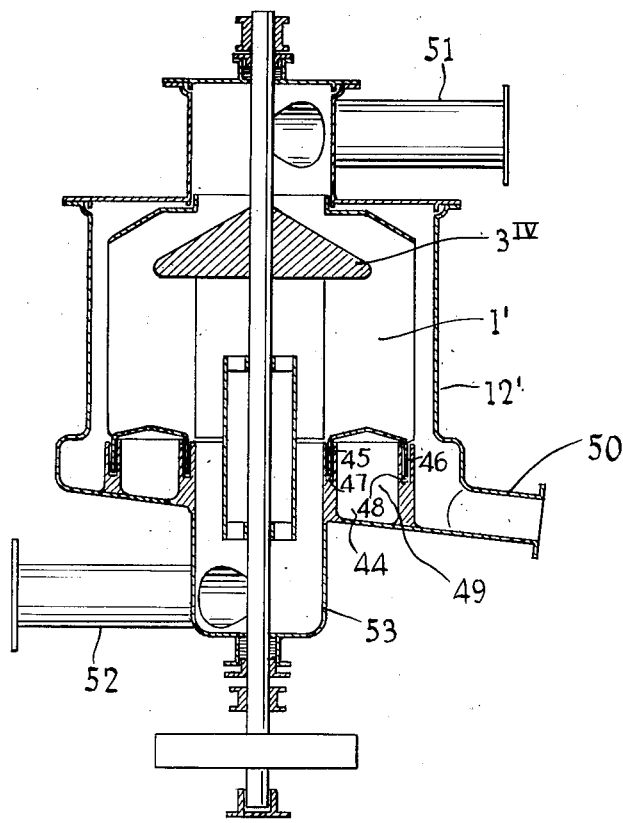

Example, Fig. 7, relates more especially to the construction of the sorting device in view of the use of a liquid as lifting fluid for the particles. The rotor is similar to the one in Fig. 5, its nave designated also by $3^{IV}$. Selection chamber 12' shows an inclined bottom 44, exhaust pipe 52 opening out in the center of this chamber (the exhaust being generated, for instance, by means of a pump, an injector, or a siphon). In the selected example this pipe 52 starts tangentially from a well 53 provided under chamber 12' and is similar to an inverted cyclone, which may help the recovery of the fine and/or light particles by insuring a regular flow of liquid and an equally regular carrying away of said particles. However, this well is not indispensable. Rotor blades 1' are provided with two concentric and annular skirts 45, 46 which rotate inside two channels 47, 48 forming between them an annular chamber 49. In said chamber is preferably kept a pure liquid identical to the lifting liquid for the particles or compatible with it and which, preferably is in permanent communication with a supply of this liquid under slight over pressure so that the suspended particles inside chamber 12' do not reach chamber 49 and consequently the inside of well 53.

Chamber or casing 12' ought to be always full of liquid and the quantity of liquid entering through admission pipe 51 and that flowing out through pipes 50, 52 (or only through pipe 52 if pipe 50 is closed) should be maintained equal, taking into consideration, if necessary, any supply of liquid coming from chamber 49. Pipe 52 may be arranged as a decanting chamber or connected to such a chamber and it is then preferable that the liquid level in such chamber be at least as high as the upper part of casing 12'.

The rotor motion, inside a chamber or casing both full of liquid, may cause some eddies and cavitations between the outline of the rotor and the inner wall of the chamber. To avoid this inconvenience, several means may be used. For instance, the casing may be provided with one or several tangential pipes distributed at various levels so that the liquid expelled by the rotor and helped by currents coming from said pipes does not brake the rotor, and helps the descent of the sorted products. Also some deflectors can be provided at the outlet of the rotor, which are suitably set and similar to directing plates or guide blading in centrifugal pumps or turbines. The best results are obtained by the combination of such tangential pipes and deflectors.

Figure 8:
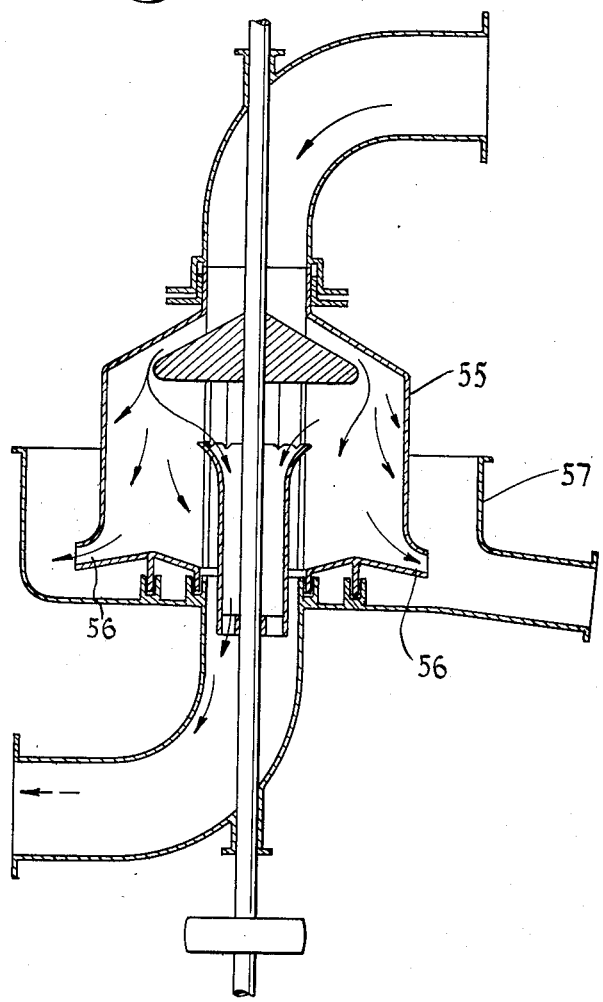

Fig. 8 shows, under the same conditions as Fig. 7, a simpler type of embodiment. In this case, the rotor is closed on the outside by a cylindrical wall 55. The large particles (or heavy particles) are then thrown against said wall 55 because of the centrifugal force. They fall along said wall and are expelled through apertures or radial nozzles 56 to be gathered in a pan 57 forming an open casing of small height. The number of apertures or nozzles 56 may be increased along the vertical side of the rotor.

The closing of the outer end of the sorting passages does not affect the proportioning of the cross section of the passages in accordance with an inverse ratio of the square root of the distance.

Naturally, the methods of embodiment described above in connection with the annexed drawings constitutes only examples illustrating the way to embody the invention and it is understood that one may depart therefrom without departing from the field of said invention.

It is to be noted that the separation provided for herein, in the case of particles which are all of the same density, that is, as usually occurs when all of the particles are of the same substance, is made in accordance with size, but when particles, all of the same size, of different densities are operated upon, the separation will be in accordance with density. In the latter case various fixed ratios between the speed of the rotor and the speed of the fan determine the degree of separation, because the ratio between the mass and the volume of a particle which will stay in equilibrium in a channel 2 is fixed. Particles for which the ratio of mass to volume is under the equilibrium ratio will pass to the center, those for which the ratio is over the equilibrium ratio will pass to the casing.

From the above it will be seen that separation will take place in accordance with size and/or density so that, particles of lesser size and/or density will pass to the center, and particles of larger size and/or density will pass to the periphery.

Although I have hereinbefore particularly described several embodiments of my invention, it is to be understood that these forms are not exhaustive but only illustrative.

What I claim as new and desire to secure by Letters Patent is:

1. In a particle sorting machine, the combination of a framed structure including a substantially vertical casing which has a central top inlet; a rotor hub revolubly borne in said structure, located in said casing in coaxial relationship therewith, said hub having an upper face which slopes downwardly and outwardly to a portion of maximum diameter; a plurality of blades fast with and radiating outwardly from said hub, said blades extending to a point proximate to the inner periphery of said casing and a considerable distance downwards below said hub portion of maximum diameter, said blades being so much thicker at their outer periphery than at their inner periphery, that the passages formed between adjacent blades have outwardly tapering cross-sections; means in ring formation at the upper part of said blades for closing the marginal upper portions of said passages while leaving a central upper opening of less diameter than said hub portion of maximum diameter; means in ring formation at the lower part of said blades for closing the marginal lower portions of said passages while leaving a central lower opening of less diameter than said hub portion of maximum diameter; means for rotating said rotor; means providing an exit from the lower peripheral portion of said casing; means providing a separate exit from said central lower opening at the lower part of said blades; and means comprising an impeller controllable separately from said rotating means, for passing a suspension of particles to be sorted in a fluid carrier as a downdraft from said central top inlet of said casing, through said passages, to said central lower opening and thence to said separate exit means.

2. In a particle sorting machine, the combination of a framed structure including a substantially vertical casing which has a central top inlet and a bottom outlet; a rotor within said casing, revolubly borne in said structure in coaxial relationship with said casing, said rotor comprising a central hub formed with a top surface which slopes downwardly and outwardly with the largest diameter positioned intermediate the center and the periphery of said rotor and intermediate the top and the bottom thereof, the ring portion of said rotor from said hub to the rotor periphery being formed with outwardly open, radial passages each of which has an outwardly decreasing cross-section; means in ring formation at the upper part of said rotor ring portion for closing the marginal upper portions of said passages; while leaving a central upper opening of less diameter than said hub largest diameter; means in ring formation at the lower part of said rotor ring portion for closing the marginal lower portions of said passages, while leaving a central lower opening of less diameter than said hub largest diameter; tubular means below said lower opening providing an exit therefrom; means providing a seal between said tubular means and said means for closing the marginal lower portions of said passages; means for rotating said rotor; and means comprising an impeller for passing a suspension of particles to be sorted in a fluid carrier at a rate adjustable independently of the speed of rotation of said rotor, as a downdraft from said central top inlet of said casing, through said passages in said rotor, to said central lower opening and thence into said tubular means.

3. A rotor for particle sorting machines, which comprises a central hub having an upper face which slopes downwardly and outwardly to a hub portion of maximum diameter; a plurality of blades fast with and radiating outwardly from said hub, said blades extending a considerable distance downwards below said hub portion of maximum diameter and being so much thicker at their outer periphery that the passages formed between adjacent blades have outwardly tapering cross-sections; means in ring formation at the upper part of said blades for closing the marginal upper portions of said passages; and means in ring formation at the lower part of said blades for closing the marginal lower portions of said passages and leaving a central opening of less diameter than said hub portion of maximum diameter.

FRANÇOIS MARIE ROUGET.

REFERENCES CITED

The following references are of record in the file of this patent:

UNITED STATES PATENTS

| Number | Name | Date |
|---|---|---|
| 294,248 | McIntyre | Feb. 26, 1884 |
| 459,267 | Clarkson | Sept. 8, 1891 |
| 459,315 | Stanfield et al. | Sept. 8, 1891 |
| 653,792 | Dasconaguerre | July 17, 1900 |
| 1,358,375 | Koch | Nov. 9, 1920 |
| 1,393,335 | Baldwin | Oct. 11, 1921 |
| 1,517,509 | Hokanson | Dec. 2, 1924 |
| 1,743,344 | Hawley | Jan. 14, 1930 |
| 1,785,918 | Stebbins | Dec. 23, 1930 |
| 1,905,458 | Geffney | Apr. 25, 1933 |

FOREIGN PATENTS

| Number | Country | Date |
|---|---|---|
| 14,105 of 1903 | Great Britain | May 12, 1904 |
| 194,219 | Great Britain | Mar. 8, 1923 |